US009627914B2

United States Patent
Kim et al.

(10) Patent No.: US 9,627,914 B2
(45) Date of Patent: Apr. 18, 2017

(54) COMMUNICATION SYSTEM USING WIRELESS POWER

(75) Inventors: Sang Joon Kim, Seoul (KR); Ui Kun Kwon, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 818 days.

(21) Appl. No.: 13/592,677

(22) Filed: Aug. 23, 2012

(65) Prior Publication Data

US 2013/0049483 A1    Feb. 28, 2013

(30) Foreign Application Priority Data

Aug. 24, 2011 (KR) .................. 10-2011-0084695

(51) Int. Cl.
*H02J 17/00* (2006.01)
*H02J 7/02* (2016.01)

(52) U.S. Cl.
CPC .................. *H02J 7/025* (2013.01)

(58) Field of Classification Search
CPC . H02J 5/005; H02J 7/025; H02J 17/00; H01F 38/14; B60L 11/182
USPC ........................................... 307/104
See application file for complete search history.

(56) References Cited

U.S. PATENT DOCUMENTS

| 2006/0220859 A1* | 10/2006 | Nagai ................ B41J 3/50 340/572.1 |
| 2007/0082611 A1* | 4/2007 | Terranova ............ H04B 5/0012 455/41.1 |
| 2009/0027169 A1* | 1/2009 | Kondo ................ G06K 7/0008 340/10.2 |
| 2009/0058190 A1* | 3/2009 | Tanaka ............... G06K 19/0701 307/104 |
| 2009/0085408 A1 | 4/2009 | Bruhn |
| 2009/0284082 A1 | 11/2009 | Mohammadian |
| 2010/0084918 A1 | 4/2010 | Fells et al. |
| 2010/0171367 A1* | 7/2010 | Kitamura ................ H02J 7/025 307/104 |
| 2010/0184371 A1 | 7/2010 | Cook et al. |
| 2010/0187912 A1 | 7/2010 | Kitamura et al. |

(Continued)

FOREIGN PATENT DOCUMENTS

| CN | 101425704 A | 5/2009 |
| CN | 101777801 A | 7/2010 |

(Continued)

OTHER PUBLICATIONS

International Search Report issued Feb. 28, 2013 in counterpart International Patent Application No. PCT/KR2012/006785. (70 pages in English).

(Continued)

*Primary Examiner* — Thienvu Tran
*Assistant Examiner* — Brian K Baxter
(74) *Attorney, Agent, or Firm* — NSIP Law

(57) ABSTRACT

Provided is an apparatus and method for wirelessly transmitting power. According to one general aspect, a communication device using wireless power may include: a transmitter configured to transmit, to a target resonator, energy stored in a source resonator through mutual resonance; an energy compensator configured to compensate for energy expended in the source resonator; and a controller configured to control an electrical connection providing energy to the source resonator.

23 Claims, 12 Drawing Sheets

(56) References Cited

U.S. PATENT DOCUMENTS

| | | | |
|---|---|---|---|
| 2010/0301678 A1 | 12/2010 | Kim et al. | |
| 2011/0018358 A1* | 1/2011 | Kozakai | H02J 7/025 307/104 |
| 2011/0133569 A1* | 6/2011 | Cheon | H02J 17/00 307/104 |
| 2011/0184888 A1 | 7/2011 | Lee et al. | |
| 2012/0062203 A1* | 3/2012 | Kim | H02J 7/025 323/304 |
| 2012/0328043 A1* | 12/2012 | Kwon | H04B 5/0081 375/295 |
| 2013/0059533 A1* | 3/2013 | Kwon | H04B 5/0037 455/41.1 |

FOREIGN PATENT DOCUMENTS

| | | |
|---|---|---|
| CN | 101964678 A | 2/2011 |
| JP | 6-96300 A | 4/1994 |
| JP | 2002-171198 A | 6/2002 |
| JP | 2004-356765 A | 12/2004 |
| JP | 2006-353094 A | 12/2006 |
| JP | 2009-105865 A | 5/2009 |
| JP | 2011-109810 A | 6/2011 |
| KR | 10-0277547 A | 10/2000 |
| KR | 10-0328249 A | 2/2002 |
| KR | 10-2003-0088817 A | 11/2003 |
| KR | 10-2010-0057632 A | 5/2010 |
| WO | WO 2009/140218 A1 | 11/2009 |
| WO | WO 2011/074082 A1 | 6/2011 |

OTHER PUBLICATIONS

Extended European Search Report issued on Feb. 18, 2015 in counterpart European Application No. 12825361.4 (6 pages, in English).

Japanese Office Action issued on Feb. 23, 2016 in counterpart Japanese Application No. 2014-527080 (24 pages in English; 16 pages in Japanese).

Chinese Office Action issued on May 3, 2016 in counterpart Chinese Patent Application No. 201280003623.3 (8 pages in English; 6 pages in Chinese).

Office Action issued by the European Patent Office on Sep. 28, 2016 in corresponding EP Patent Application No. 12825361.4.

* cited by examiner

COMMUNICATION SYSTEM USING WIRELESS POWER

CROSS-REFERENCE TO RELATED APPLICATION(S)

This application claims the benefit under 35 U.S.C. §119(a) of Korean Patent Application No. 10-2011-0084695, filed on Aug. 24, 2011, in the Korean Intellectual Property Office, the entire disclosure of which is incorporated herein by reference for all purposes.

BACKGROUND

1. Field

The following description relates to wireless power transmission.

2. Description of Related Art

Research into wireless power transmission has been conducted to address the limited capacity of conventional batteries, and the inconvenience of wired power for portable devices, and the like. The research is mainly focused on near-field wireless power transmission. Near-field wireless power transmission refers to a situation in which the distance between transmission and reception coils is sufficiently short when compared to the wavelength at an operating frequency. One conventional wireless power transmission and reception system uses a resonance characteristic and may include a source for providing power and a target for receiving power.

SUMMARY

According to one general aspect, a communication device using wireless power may include: a transmitter configured to transmit, to a target resonator, energy stored in a source resonator through mutual resonance; an energy compensator configured to compensate for energy expended in the source resonator; and a controller configured to control an electrical connection providing energy to the source resonator.

The communication device may further include: a modulator configured to modulate information using mutual resonance between the source resonator and the target resonator.

The energy compensator may compensate for energy expended due to an internal resistance, a radiation resistance, or both, of the source resonator in the energy stored in the source resonator.

The energy compensator may include: a detector configured to detect energy expended in the source resonator; and a compensator configured to compensate for the detected energy.

The energy compensator may compensate for the expended energy using an active element so that a quality (Q) factor of the source resonator has a value greater than or equal to a predetermined value.

The modulator may modulate the information depending on whether generating mutual resonance between the source resonator and the target resonator is performed.

The modulator may modulate the information by quantizing a level of the energy stored in the source resonator.

The controller may determine whether to generate mutual resonance between the source resonator and the target resonator by controlling the electrical connection between the source resonator and a power feeding unit.

The controller may control an electrical connection between the power feeding unit and the energy compensator so that energy is provided to the energy compensator from a power feeding unit.

The communication device may further include: a receiver configured to receive energy transmitted from the target resonator through mutual resonance between the source resonator and the target resonator; and a demodulator configured to determine whether mutual resonance occurs by detecting a waveform of the received energy, and to demodulate information transmitted by the target resonator based on whether mutual resonance occurs.

According to another general aspect, a communication device using wireless power may include: a transmitter configured to transmit, to a source resonator, energy stored in a target resonator through mutual resonance; an energy compensator configured to compensate for energy expended in the target resonator; and a controller configured to control an electrical connection between the target resonator and a load provided with energy from the target resonator.

The communication device may further include: a modulator configured to modulate information using mutual resonance between the source resonator and the target resonator.

The communication device may further include: a receiver configured to receive energy transmitted from the source resonator through mutual resonance between the target resonator and the source resonator; and a demodulator configured to determine whether mutual resonance occurs by detecting a waveform of the received energy, and to demodulate information transmitted by the source resonator based on whether mutual resonance occurs.

The energy compensator may compensate for energy expended due to an internal resistance, a radiation resistance, or both, of the target resonator in the energy stored in the target resonator.

The energy compensator may include: a detector configured to detect energy expended in the target resonator; and a compensator configured to compensate for the detected energy.

The energy compensator may compensate for the energy expended using an active element so that a quality (Q) factor of the target resonator has a value greater than or equal to a predetermined value.

The controller may determine whether to generate mutual resonance between the target resonator and the source resonator by changing a resonant frequency of the target resonator.

The communication device may further include: a driving power unit configured to provide energy used for driving the energy compensator.

The controller may include: a monitoring unit configured to monitor a magnitude of energy received in the target resonator; a capturing unit configured to capture the energy stored in the target resonator when the monitored magnitude of energy has a peak value within a predetermined period; and a compensator configured to compensate for energy provided by the driving power unit using the captured energy.

According to yet another general aspect, a communication system wireless power may include: a first modulator configured to modulate information using mutual resonance between a source resonator and a target resonator; a first transmitter configured to transmit, to the target resonator, energy stored in the source resonator through mutual resonance; a first energy compensator configured to compensate for energy expended in the source resonator; a first controller configured to control an electrical providing energy to the source resonator; a first receiver configured to receive energy transmitted from the target resonator through mutual resonance between the source resonator and the target resonator; a first demodulator configured to determine whether mutual resonance occurs by detecting a waveform of the received energy, and to demodulate information transmitted by the source resonator based on whether mutual resonance occurs; a second energy compensator configured to compensate for energy expended in the target resonator; and a second controller configured to control an electrical connection between the target resonator and a load provided with energy from the target resonator.

The communication system may further include: a second modulator configured to modulate information using mutual resonance between the source resonator and the target resonator; and a second transmitter configured to transmit, to the source resonator, energy stored in the target resonator through mutual resonance.

The communication system may further include: a second receiver configured to receive energy transmitted from the target resonator through mutual resonance between the source resonator and the target resonator; and a second demodulator configured to determine whether mutual resonance occurs by detecting a waveform of the received energy, and to demodulate information transmitted by the target resonator based on whether mutual resonance occurs.

The first energy compensator may compensate for the energy expended using an active element so that a quality (Q) factor of the source resonator has a value greater than or equal to a predetermined value.

The second energy compensator may compensate for the expended energy using an active element so that a Q factor of the target resonator has a value greater than or equal to a predetermined value.

According to still another general aspect, a communication method using wireless power may include: compensating for energy expended in a source resonator; controlling an electrical connection providing energy to the source resonator; and transmitting, to a target resonator, energy stored in the source resonator through mutual resonance.

The compensating may include compensating for energy expended due to an internal resistance, a radiation resistance, or both, of the source resonator in the energy stored in the source resonator.

The communication method may further include: modulating information using mutual resonance between the source resonator and the target resonator.

According to a further general aspect, a communication method using wireless power may include: compensating for energy expended in a target resonator; controlling an electrical connection between the target resonator and a load provided with energy from the target resonator; and transmitting, to the source resonator, energy stored in the target resonator through mutual resonance.

The compensating may include compensating for energy expended due to an internal resistance and a radiation resistance of the target resonator in the energy stored in the target resonator.

The communication method may further include: modulating information using mutual resonance between the source resonator and the target resonator.

Other features and aspects will be apparent from the following detailed description, the drawings, and the claims.

Figure 1:
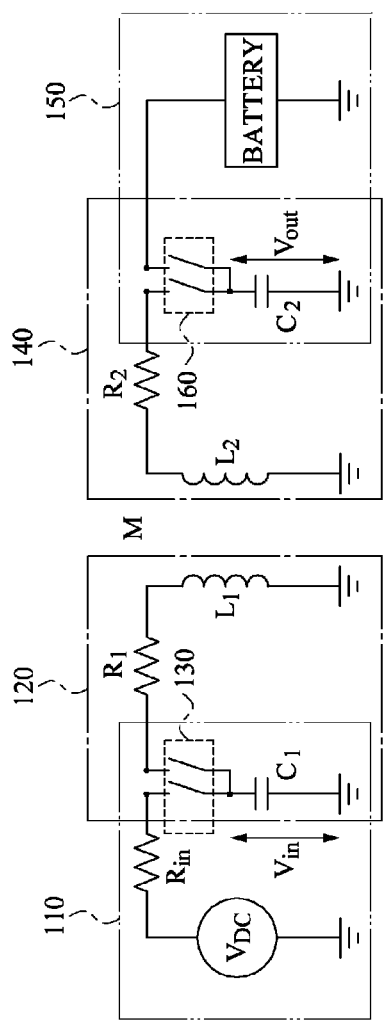
FIG. 1 is a diagram illustrating an equivalent circuit of a communication system using wireless power in which a power input unit and a power transmission unit are physically isolated by a capacitor and a switch unit, and a receiver and a power output unit are physically isolated by another capacitor and another switch unit.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

A communication system using wireless power according to an aspect may be applied to various systems using wireless power transmission. For instance, the communication system may be used for exchanging control information and other types of information between a transmission end and a reception end in a system using a wireless power transmission such as a cell phone, a wireless television (TV), and the like. In addition, the communication system may be used in a bio-healthcare field and thus, may be used, for example, for remotely transmitting power to a device inserted into a body, or for wirelessly transmitting power to a bandage-type device for measuring a heartbeat.

A communication system using wireless power according to another aspect may be used as a remote control of an information storage device excluding a power source. Also, the communication system may be used as a system for remotely providing power for driving a device to the information storage device, and for wirelessly loading information stored in the information storage device.

The communication system using wireless power may generate a signal by storing energy from a power supply device in a source resonator, and turning OFF a switch that electrically connects the power supply device and the source resonator, thereby inducing self-resonance of the source resonator. When a target resonator having the same resonant frequency as a resonant frequency of a self-resonating source resonator is sufficiently near to the source resonator to couple with the source resonator, a mutual resonance may occur between the source resonator and the target resonator. The source resonator may refer to a resonator provided with energy from a power supply device, and the target resonator may refer to a resonator receiving energy delivered through a mutual resonance.

FIG. 1 illustrates an equivalent circuit of a communication system using wireless power in which a power input unit 110 and a power transmission unit 120 are physically isolated by a capacitor $C_1$ and a switch unit 130, and a receiver 140 and a power output unit 150 are physically isolated by a capacitor $C_2$ and a switch unit 160.

Referring to FIG. 1, the communication system using wireless power may correspond to a source-target configuration having a source and a target. The communication system using wireless power may include a wireless power transmission device corresponding to a source and a wireless power reception device corresponding to a target.

The wireless power transmission device may include the power input unit 110, the power transmission unit 120, and the switch unit 130. The power input unit 110 may store energy in the capacitor $C_1$ using a power supply device. The switch unit 130 may connect the capacitor $C_1$ to the power input unit 110 while energy is stored in the capacitor $C_1$, and may disconnect the capacitor $C_1$ from the power input unit 110, so that the capacitor $C_1$ may be connected to the power transmission unit 120 while energy stored in the capacitor $C_1$ is discharged. Thus, the switch unit 130 may prevent the capacitor $C_1$ from being simultaneously connected to the power input unit 110 and the power transmission unit 120.

The power transmission unit 120 may transfer electromagnetic energy to the receiver 140. A transmission coil $L_1$ of the power transmission unit 120 may transfer power through a mutual resonance with a reception coil $L_2$ of the receiver 140. The level of mutual resonance occurring between the transmission coil $L_1$ and reception coil $L_2$ may be affected by a mutual inductance M.

The power input unit 110 may include an input voltage $V_{DC}$, an internal resistance $R_{in}$, and a capacitor $C_1$, the power transmission unit 120 may include circuit elements $R_1$, $L_1$, and $C_1$ which reflect a physical property corresponding to the power transmission unit 120, and the switch unit 130 may include one or more switches. An active device may be used as a switch to perform an ON and OFF function. As will be appreciated, R denotes a resistance component, L denotes an inductor component, and C denotes a capacitance component. Voltage across the capacitor $C_1$ corresponding to a portion of the input voltage $V_{DC}$ may be indicated by $V_{in}$.

The wireless power reception device may include the receiver 140, the power output unit 150, and the switch unit 160. The receiver 140 may receive electromagnetic energy from the power transmission unit 120. The receiver 140 may store received electromagnetic energy in a connected capacitor. The switch unit 160 may connect the capacitor $C_2$ to the receiver 140 while energy is stored in the capacitor $C_2$, and may disconnect the capacitor $C_2$ from the receiver 140 so that the capacitor $C_2$ may be connected to the power output unit 150 while energy stored in the capacitor $C_2$ is delivered to a load. The switch unit 160 may prevent the capacitor $C_2$ from being simultaneously connected to the receiver 140 and the power output unit 150.

A reception coil $L_2$ of the receiver 140 may receive power through a mutual resonance with the transmission coil $L_1$ of the power transmission unit 120. Using the received power, the capacitor $C_2$ connected to the reception coil $L_2$ may be charged. As shown, the power output unit 150 may deliver the power charged in the capacitor $C_2$ to a battery. Alternatively or additionally, the power output unit 150 may deliver power to a load or a target device.

The receiver 140 may include circuit elements $R_2$, $L_2$, and $C_2$ by reflecting a physical property corresponding to the receiver 140, the power output unit 150 may include the capacitor $C_2$ and the battery, and the switch unit 160 may include one or more switches. The voltage across the capacitor $C_2$ corresponding to a portion of the energy received by the reception coil $L_2$ may be indicated by $V_{out}$.

As described in the foregoing, a resonator isolation (RI) system for transmitting power by physically isolating the power input unit 110 and the power transmission unit 120, and the receiver 140 and the power output unit 150 may be advantageous especially when compared to a conventional scheme using an impedance matching. In some instances, a power amplifier may not be used since power may be supplied directly from a direct current (DC) source to a source resonator. And, in some instances, rectification performed by a rectifier may not be needed since energy is captured from power stored in a capacitor at a reception end. Transmission efficiency may not be responsive to a change in distance between a transmission end and a reception end since impedance matching may not be used. The RI system may be easily extended to a communication system that uses wireless power and includes a plurality of transmission ends and a plurality of reception ends.

Figure 2:
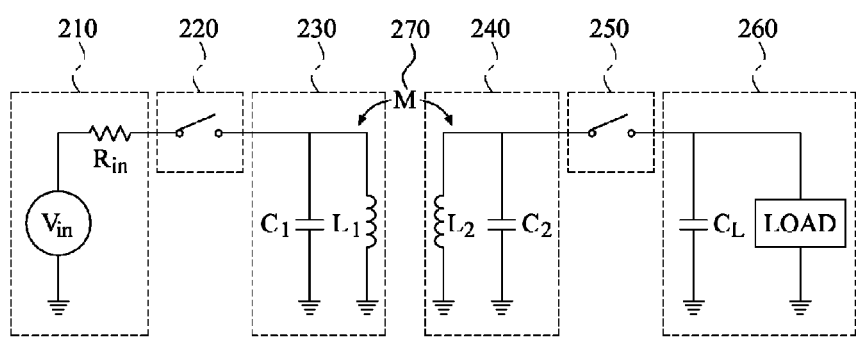
FIG. 2 is a diagram illustrating an equivalent circuit of a communication system using wireless power in which a power charger and a transmitter are physically isolated by a switch, and a charger and a power output unit are physically isolated by another switch.

FIG. 2 illustrates an equivalent circuit of a communication system using wireless power in which a power charger 210 and a transmitter 230 are physically isolated by a switch, and a charger 240 and a power output unit 260 are physically isolated by another switch.

Referring to FIG. 2, the communication system using wireless power may correspond to a source-target configuration having a source and a target. The communication system using wireless power may include a wireless power transmission device corresponding to a source and a wireless power reception device corresponding to a target, for instance.

The wireless power transmission device may include the power charger 210, a controller 220, and the transmitter 230. The power charger 210 may include a power supply device $V_{in}$, and a resistor $R_{in}$. A source resonator may include a capacitor $C_1$ and an inductor $L_1$. The transmitter 230 may transmit energy stored in the source resonator through a mutual resonance between the source resonator and a target resonator. The controller 220 may be configured to turn the switch ON to provide power from the power charger 210 to the source resonator. The power supply device $V_{in}$, may apply a voltage to the capacitor $C_1$, and may apply a current to the inductor $L_1$. In response to the wireless power transmission device reaching a steady state, the voltage applied to the capacitor $C_1$ may become "0," and the current flowing through the inductor $L_1$ may have a value of $V_{in}/R_{in}$. At the steady state, the inductor $L_1$ may be charged through the applied current.

The controller 220 may turn the switch OFF when power stored in the source resonator reaches a predetermined value at the steady state. Information of the predetermined value may be set in the controller 220. The power charger 210 and the transmitter 230 may be isolated from each other. The source resonator may initiate a self-resonance between the capacitor $C_1$ and the inductor $L_1$. Energy stored in the source resonator may be delivered to the target resonator through a mutual resonance between the source resonator and the target resonator based on a mutual inductance M 270. A resonant frequency $f_1$ of the source resonator may be equal to a resonant frequency $f_2$ of the target resonator.

$$f_1 = \frac{1}{2\pi\sqrt{L_1 C_1}}, f_2 = \frac{1}{2\pi\sqrt{L_2 C_2}}$$
$$f_1 = f_2$$

The wireless power reception device may include the charger 240, a controller 250, and the power output unit 260. The target resonator may include a capacitor $C_2$ and an inductor $L_2$. When a mutual resonance occurs between the source resonator and the target resonator, the source resonator may be isolated from the power supply device $V_{in}$, and the target resonator may be isolated from a load and a capacitor $C_L$. The capacitor $C_2$ and the inductor $L_2$ of the target resonator may be charged through a mutual resonance. The controller 250 may turn a switch OFF to charge the target resonator. While the switch is in an OFF state, the resonant frequency of the source resonator may be substantially equal to the resonant frequency of the target resonator, and mutual resonance may occur. And, in response to power charged in the target resonator reaching a predetermined value, the controller 250 may turn the switch ON. Information of the predetermined value may be set in the controller 250. When the switch is turned ON, the capacitor $C_L$ may be connected to the target resonator, and a resonant frequency of the target resonator may change to $f_2'$ where:

$$f_2' = \frac{1}{2\pi\sqrt{L_2(C_2 + C_L)}}$$

Thus, the mutual resonance between the source resonator and the target resonator may be terminated. When $f_2'$ is small when compared to $f_2$, in consideration of Q (Quality) factor of the target resonator, a mutual resonant channel may cease to exist. The power output unit 260 may deliver, to the load, power stored in the capacitor $C_2$ and the inductor $L_2$. The power output unit 260 may deliver power using a scheme appropriate for the load.

The controller 250 may turn the switch OFF when power charged in the target resonator has a value less than a predetermined value. The charger 240 may charge the target resonator through a mutual resonance between the source resonator and the target resonator.

The switch may not be turned ON when mutual resonance occurs between the source resonator and the target resonator.

Thus, a decrease in transmission efficiency due to a connection of a switch may be prevented.

When the analog circuit of FIG. 2 is compared to an equivalent circuit of FIG. 1 in which energy charged in a capacitor is delivered, it may be easier to control a point in time of capturing energy stored in the target resonator in some instances. While the scheme of delivering energy charged in a capacitor may capture energy stored in the capacitor, a scheme of capturing energy by changing a resonant frequency may capture energy stored in an inductor and a capacitor of the target resonator. Thus, a degree of freedom for the point in time of capturing energy may be enhanced.

In the communication system using wireless power of FIG. 2, a mutual resonance operation between the source resonator and the target resonator may be used to deliver information. The source resonator may either generate or not generate a mutual resonance during a period of time predetermined with a target resonator, for example, a single symbol period through an operation of either inserting or not inserting energy into the source resonator during the period of time. In this instance, the source resonator may allocate information according to whether a mutual resonance occurs. The target resonator may generate or not generate a mutual resonance through an operation of a matching or a mismatching between a resonant frequency of the target resonator and a resonant frequency of the source resonator during a predetermined period of time. For instance, the target resonator may allocate information according to whether a mutual resonance occurs.

When a strong mutual resonance occurs between the source resonator and the target resonator, the performance of modulating and demodulating information may be enhanced for each of the source and the target. Moreover, when a strong mutual resonance occurs, energy may be exchanged between the source resonator and the target resonator within a relatively short period of time, and an amount of information allocated during a predetermined period of time may increase. For instance, when a strong mutual resonance occurs, the physical distance for delivering information between the source resonator and the target resonator may increase.

Strengthening the mutual resonance between the source resonator and the target resonator may be a significant factor in enhancing the performance of transmitting information. To strengthen the mutual resonance, a Q factor of a resonator may be increased, and/or the mutual inductance M between two resonators may be increased. For instance, the mutual inductance M may correspond to a value depending on the physical size of a resonator, and the performance may be roughly determined when the physical size of the resonator is determined in a system. The Q factor may be a value indicating a degree of energy loss of a resonator. The Q factor may be roughly determined when the physical size of the resonator is determined. The Q factor may increase when a negative resistance is used, for example.

Figure 3:
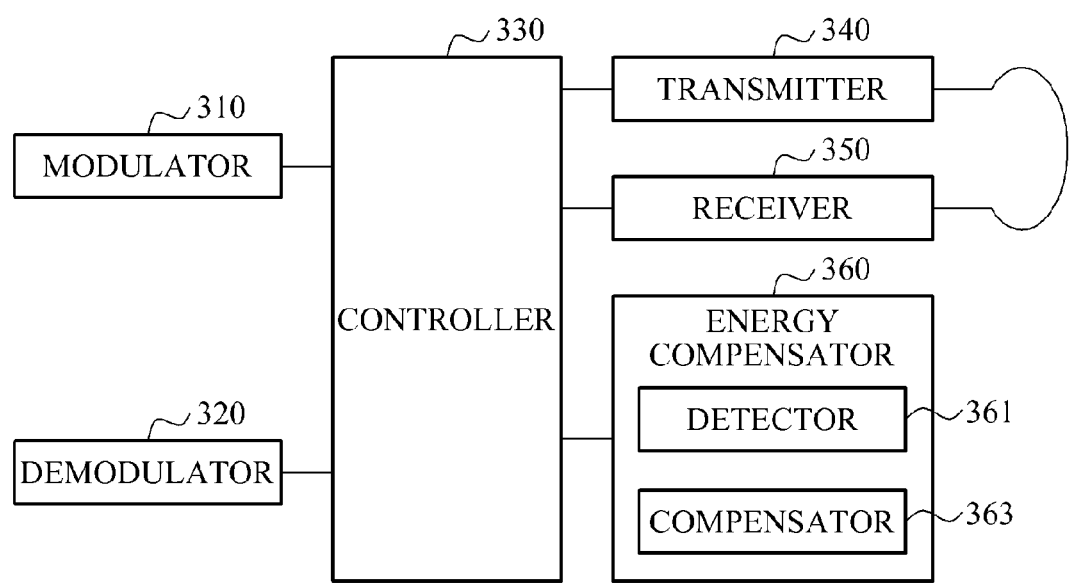
FIG. 3 is a block diagram illustrating a communication device using wireless power.

FIG. 3 illustrates a communication device using wireless power.

Referring to FIG. 3, the communication device using wireless power according to an aspect includes a modulator 310, a demodulator 320, a controller 330, a transmitter 340, a receiver 350, and an energy compensator 360. The communication device using wireless power of FIG. 3 may correspond to a transmission (TX) end that transmits energy.

The modulator 310 may modulate information using a mutual resonance between a source resonator and a target resonator. Whether the mutual resonance occurs may be determined based on whether energy is delivered from a power feeding unit to the source resonator. The modulator 310 may modulate information by allocating information depending on whether the mutual resonance occurs. The modulator 310 may modulate information by quantizing a level of the energy stored in the source resonator.

The transmitter 340 may transmit, to the target resonator, energy stored in the source resonator through the mutual resonance. Energy may be stored in the source resonator by delivering energy from the power feeding unit and/or other equipment.

The energy compensator 360 may compensate for energy expended in the source resonator. A portion of energy stored in the source resonator may be expended due to an internal resistance and a radiation resistance of the source resonator. The radiation resistance may correspond to a resistance component generated when power is radiated from the source resonator, for example. Also, the internal and radiation resistance may correspond to a real part of an impedance expressed in an equivalent circuit when power is radiated from the source resonator. The energy compensator 360 may compensate for energy expended due to the internal resistance, the radiation resistance, or both, of the source resonator. The energy compensator 360 may compensate for energy expended by being provided with energy from the power feeding unit. The energy compensator 360 may compensate for energy expended using an active element. The active element may include a transistor, an operational amplifier (OP-AMP), a diode, and/or the like. The energy compensator 360 may compensate for energy expended so that a Q factor of the source resonator may be greater than equal to a predetermined value. The Q factor may be determined according to a ratio of energy expended in the source resonator. As a result, when the expended energy is reduced through energy compensation, the Q factor may increase.

The energy compensator 360 may include a detector 361 and a compensator 363. The detector 361 may detect energy expended in the source resonator. The expended energy may correspond to a portion of energy (other than energy delivered through a mutual resonance stored in the source resonator). The compensator 363 may be configured to compensate for the energy expended, as needed, according to a predetermined compensation requirement. The predetermined compensation requirement may refer to a requirement of the Q factor being greater than equal to a predetermined value.

The controller 330 may control an electrical connection between the source resonator and the power feeding unit. The power feeding unit may provide energy to the source resonator. The source resonator and the power feeding unit may be electrically connected to each other or disconnected from each other through a switch, for instance. The source resonator and the power feeding unit may be electrically connected to each other in response to the switch being turned ON, and the source resonator and the power feeding unit may be electrically disconnected from each other in response to the switch being turned OFF. The controller 330 may be configured to control the switch connecting the source resonator and the power feeding unit. The controller 330 may be configured to control an electrical connection between the source resonator and the power feeding unit so that the source resonator and the power feeding unit may mutually resonate. For example, in a situation in which the source resonator mutually resonates when the source resonator and the power feeding unit are separated, the controller 330 may separate the source resonator and the power feeding unit.

The controller 330 may control the electrical connection between the power feeding unit and the energy compensator 360 so that energy may be provided to the energy compensator 360. The energy compensator 360 may use energy to compensate for energy expended in the source resonator, and the energy may be provided from the power feeding unit.

The receiver 350 may receive energy transmitted from the target resonator through mutual resonance between the source resonator and the target resonator. A target device may control whether to generate a mutual resonance by controlling a resonant frequency of the target resonator. Depending on whether a mutual resonance occurs, the receiver 350 may receive energy from the target resonator, and may not receive energy from the target resonator. The target device may modulate information depending on whether to generate a mutual resonance.

The demodulator 320 may determine whether a mutual resonance occurs by detecting a waveform of energy received by the receiver 350. The waveform of energy may be different depending on whether mutual resonance occurs or does not occur. The to demodulator 320 may demodulate information transmitted by the target resonator based on whether the mutual resonance occurs.

Figure 4:
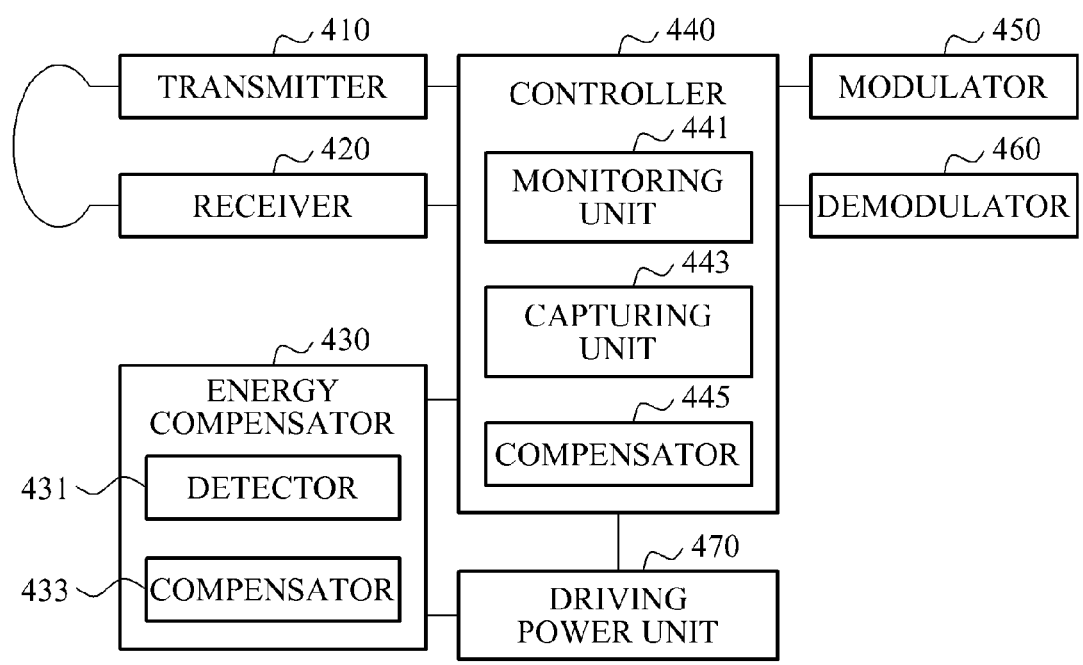
FIG. 4 is a block diagram illustrating another communication device using wireless power.

FIG. 4 illustrates another communication device using wireless power.

As shown, the communication device includes a transmitter 410, a receiver 420, an energy compensator 430, a controller 440, a modulator 450, a demodulator 460, and a driving power unit 470. The communication device using wireless power of FIG. 4 may correspond to a reception (RX) end that receives energy.

The modulator 450 may modulate information using a mutual resonance between a source resonator and a target resonator. The mutual resonance may be determined depending on whether a resonant frequency of the target resonator matches a resonant frequency of the source resonator. The modulator 450 may modulate information by allocating information according to whether a mutual resonance occurs.

The receiver 420 may receive energy transmitted from the source resonator through a mutual resonance between the target resonator and the source resonator. The received energy may be stored in the target resonator. The energy stored in the target resonator may be delivered to a load through a capturing operation. Before the capturing operation, the target resonator may continue mutually resonating with the source resonator.

The demodulator 460 may determine whether a mutual resonance occurs by detecting a waveform of the energy received by the receiver 420. The waveform of energy may be different for a situation in which a mutual resonance occurs and a situation in which a mutual resonance does not occur. The demodulator 460 may demodulate information transmitted by the source resonator based on whether the mutual resonance occurs. The demodulator 460 may demodulate information transmitted by the source resonator based on the amount of energy stored in the target resonator since a source may modulate information by quantizing a level of energy stored in the source resonator. In response to the energy stored in the source resonator being delivered to the target resonator through a mutual resonance, the demodulator 460 may demodulate information according to the level of energy stored in the target resonator. Information about a modulating scheme and/or a demodulating scheme may be predetermined between the source and the target.

The transmitter 410 may transmit, to the source resonator, energy stored in the target resonator through the mutual resonance. A TX end may receive information transmitted by an RX end by receiving energy transmitted from the target resonator. In particular, the TX end may analyze information transmitted from the RX end according to a waveform of energy transmitted from the target resonator.

The energy compensator 430 may compensate for energy expended in the target resonator. A portion of energy stored in the target resonator may be expended due to an internal resistance and a radiation resistance of the target resonator. The radiation resistance may correspond to a resistance component generated when power is radiated from the target resonator. The internal and radiation resistance may correspond to a real part of an impedance expressed in an equivalent circuit when power is radiated from the target resonator. The energy compensator 430 may compensate for energy expended due to the internal resistance and the radiation resistance of the target resonator. The energy compensator 430 may compensate for energy expended by being provided with energy from the driving power unit 470. The driving power unit 470 may provide energy used to initially operate the energy compensator 430. A chargeable characteristic (e.g., the amount of charge) of a battery may be used for the driving power unit 470. The energy compensator 430 may compensate for energy expended using an active element. The active element may include a transistor, an OP-AMP, a diode, and/or the like. The energy compensator 430 may compensate for energy expended so that a Q factor of the target resonator may be greater than equal to a predetermined value. The Q factor may be determined according to a ratio of energy expended in the target resonator. When the energy expended is reduced through energy compensation, the Q factor may increase.

The energy compensator 430 may include a detector 431 and a compensator 433. The detector 431 may detect energy expended in the target resonator. The energy expended may correspond to a portion of energy (other than energy delivered through a mutual resonance stored in the target resonator). The compensator 433 may compensate for the energy expended, for instance, according to a predetermined compensation requirement. The predetermined compensation requirement may refer to a requirement of the Q factor being greater than equal to a predetermined value.

The controller 440 may control an electrical connection between the target resonator and a load. The load may be provided with energy from the target resonator. The controller 440 may be configured to control a resonant frequency of the target resonator. When the resonant frequency of the target resonator does not match a resonant frequency of the source resonator, a mutual resonance between the target resonator and the source resonator may be terminated. The controller 440 may be configured to determine whether to generate a mutual resonance by controlling the resonant frequency of the target resonator.

The controller 440 may compensate for energy used in the driving power unit 470 by using energy stored in the target resonator. The controller 440 may include a monitoring unit 441, a capturing unit 443, and a compensator 445. The monitoring unit 441 may monitor a magnitude of energy received in the target resonator. The capturing unit 443 may capture energy when the monitored magnitude of energy has a peak value within a predetermined period. For instance, the capturing unit 443 may capture energy when a greatest amount of the energy is stored in the target resonator. During a capturing operation, the controller 440 may terminate a mutual resonance between the target resonator and the source resonator. The compensator 445 may compensate for energy used in the driving power unit 470 by using the captured energy. The energy compensator 430 may be provided with energy from the driving power unit 470 during an initial driving. After the mutual resonance, the controller 440 may compensate for energy provided from the driving power unit 470 using the captured energy, thereby maintaining, at a relatively low level, energy used for driving the energy compensator 430.

Figure 5:
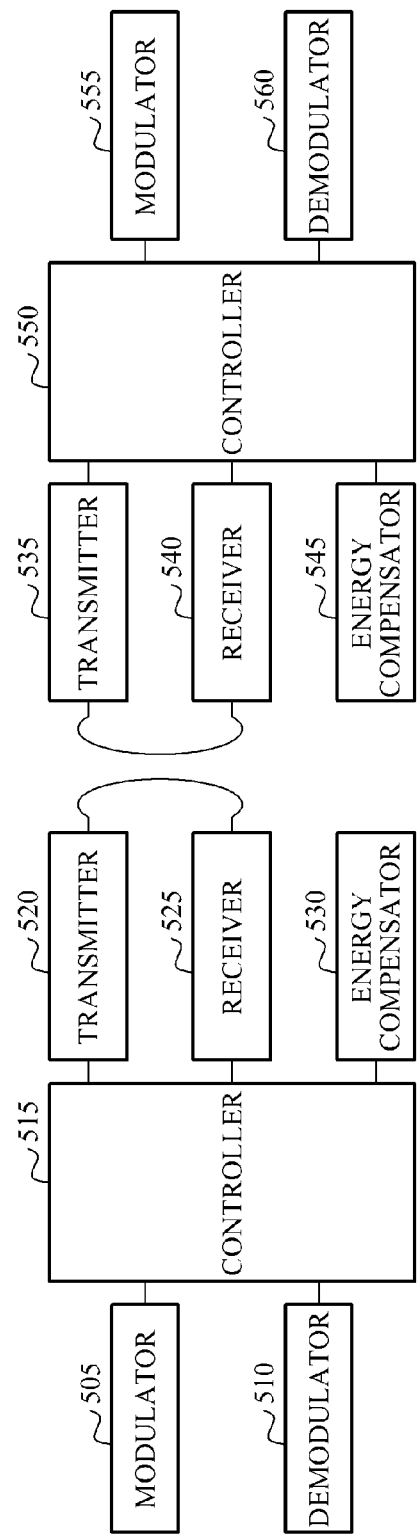
FIG. 5 is a block diagram illustrating yet another communication system using wireless power.

FIG. 5 illustrates yet another communication system using wireless power.

Referring to FIG. 5, a communication system using wireless power includes a TX end and an RX end. The TX end includes a modulator 505, a demodulator 510, a controller 515, a transmitter 520, a receiver 525, and an energy compensator 530. The RX end includes a transmitter 535, a receiver 540, an energy compensator 545, a controller 550, a modulator 555, and a demodulator 560.

At the TX end, the modulator 505 may modulate information using a mutual resonance between a source resonator and a target resonator. The transmitter 520 may transmit, to the target resonator, energy stored in the source resonator through the mutual resonance. The energy compensator 530 may compensate for energy expended in the source resonator. The energy compensator 530 may compensate for the energy expended in the source resonator using an active element so that a Q factor of the source resonator has a value greater than or equal to a predetermined value. The controller 515 may be configured to control an electrical connection between the source resonator and a power feeding unit. The receiver 525 may receive energy transmitted from the target resonator through a mutual resonance between the source resonator and the target resonator. The demodulator 510 may determine whether a mutual resonance occurs by detecting a waveform of the energy received by the receiver 525. The demodulator 510 may demodulate information transmitted by the target resonator based on whether the mutual resonance occurs.

At the RX end, the receiver 540 may receive energy transmitted from the source resonator through a mutual resonance between the source resonator and the target resonator. The demodulator 560 may determine whether a mutual resonance occurs by detecting a waveform of the received energy. The waveform of energy may be different depending on whether mutual resonance occurs or fails to occur. In addition, the demodulator 560 may to demodulate information transmitted by the source resonator based on whether the mutual resonance occurs. The energy compensator 545 may compensate for energy expended in the target resonator. For example, the energy compensator 545 may compensate for the energy expended in the target resonator using an active element so that a Q factor of the target resonator has a value greater than or equal to a predetermined value. The controller 550 may control an electrical connection between the target resonator and a load. The controller 550 may change a resonant frequency of the target resonator. The modulator 555 may modulate information using a mutual resonance between the source resonator and the target resonator. The transmitter 535 may transmit, to the source resonator, energy stored in the target resonator through the mutual resonance.

Figure 6:
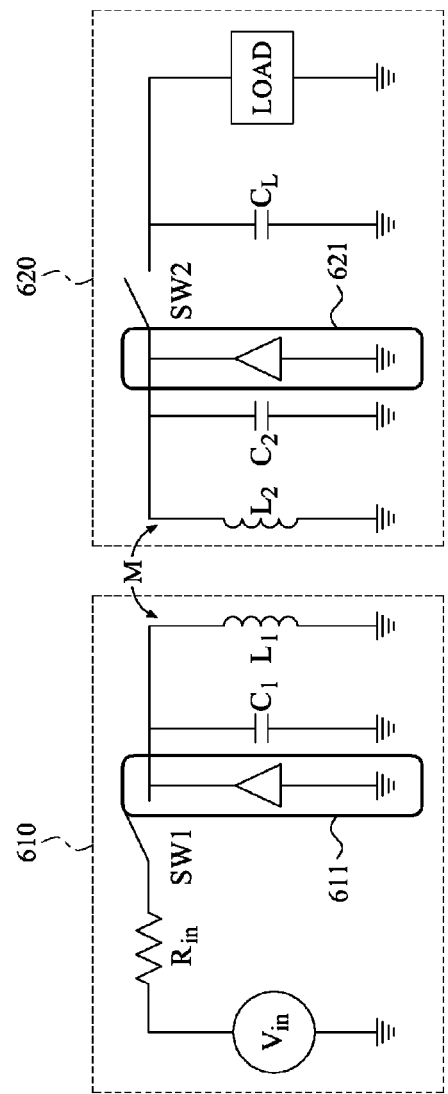
FIG. 6 is a diagram illustrating an equivalent circuit of a communication system using wireless power with an energy compensation unit.

FIG. 6 is a diagram illustrating an equivalent circuit of a communication system using wireless power with an energy compensation unit.

A resonator isolation (RI) system that charges with energy from a direct current (DC) source and delivers a signal using a mutual resonance phenomenon between a source resonator and a target resonator may have two resonance phenomena, i.e., a strong mutual coupling and a weak mutual coupling according to a physical distance between resonators. A Q factor may correspond to a value indicating a ratio of energy expended in each resonator when two resonators mutually resonate. A Q factor may be evaluated as a ratio of stored energy to expended energy. In some instances, the Q factor may correspond to a ratio between energy stored in each resonator and expended energy. Thus, as the Q factor increases, an amount of energy expended in a resonator may decrease.

The source resonator and the target resonator may be strongly mutually coupled when a coupling coefficient k between the source resonator and the target resonator is greater than $k_{sp}$ expressed below, and otherwise may be weakly mutually coupled.

$$k_{sp} = \frac{1}{\sqrt{2}} \sqrt{\frac{1}{Q_1^2} + \frac{1}{Q_2^2}}$$

In this instance, $k_{sp}$ indicates a coupling coefficient corresponding to a criterion between a strong mutual coupling and a weak mutual coupling, $Q_1$ denotes a Q factor of the source resonator, and $Q_2$ denotes a Q factor of the target resonator. For example, when both of $Q_1$ and $Q_2$ correspond to 100, the source resonator and the target resonator may be strongly, mutually coupled for $k_{sp}$ greater than 0.01, and may be weakly, mutually coupled for $k_{sp}$ less than 0.01. As a Q factor increases, the coupling coefficient $k_{sp}$ corresponding to a strong mutual coupling may decrease. In general, the coupling coefficient $k_{sp}$ is considered to be inversely proportional to a third power of a distance between the source resonator and the target resonator. Thus, as a Q factor increases, the distance at which a strong mutual coupling occurs may increase.

Referring to FIG. 6, the equivalent circuit includes a TX end 610 and a RX end 620. A portion provided in a triangular shape at the TX end 610 corresponds to an active element 611. A portion provided in a triangular shape at the RX end 620 corresponds to an active element 621. An active element may increase a Q factor of the source resonator by compensating for energy expended due to a resistance component in the source resonator. For an RLC serial equivalent circuit, a Q factor may be expressed as the following equation.

$$Q = \frac{1}{R}\sqrt{\frac{L}{C}}$$

As the resistance component R of a resonator decreases, a Q factor may increase. The active element may be used to compensate for energy expended due to a resistance component of the source resonator, thus decreasing a valid resistance component of the source resonator, and increasing a Q factor. The active element may be expressed as a negative resistance to indicate the valid resistance component is decreased. By connecting the negative resistance to the two resonators, the Q factor thereof may be increased. As the Q factor of a resonator increases, the physical distance at which a strong mutual coupling occurs between the source resonator and the target resonator may increase.

Figure 7:
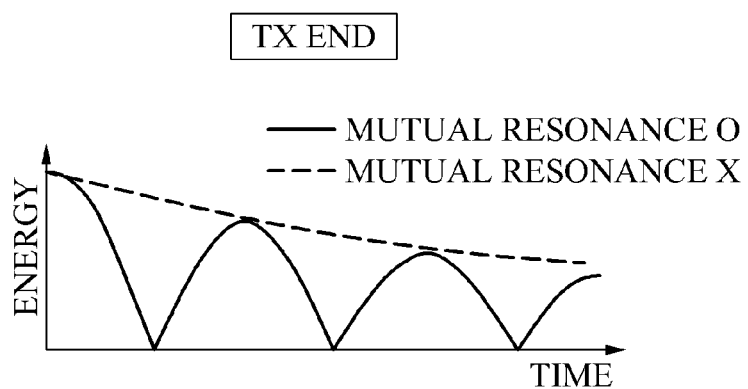
FIG. 7 is a graph illustrating a variation of energy applied to a source resonator and a target resonator strongly, mutually coupled in a communication system using wireless power.
Figure 7:
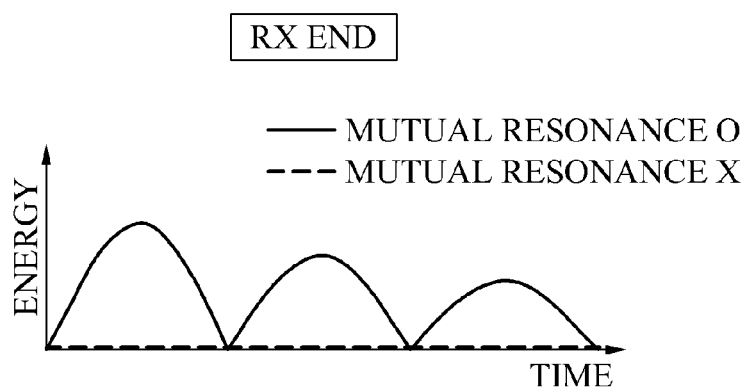

FIG. 7 illustrates a variation of energy applied to a source resonator and a target resonator strongly mutually coupled in a communication system using wireless power.

When the source resonator and the target resonator are strongly, mutually coupled, all initial energy stored in the source resonator may be delivered to the target resonator during a predetermined period of time, and the delivered energy may return to the source resonator, which may be referred to as an energy rebound phenomenon and may be repeated (as necessary) until all energy remaining in the two resonators is expended. The energy expended in a resonator may be a result of an internal resistance and radiation resistance component. The resistance component may entail decreasing of energy stored in the two resonators, and a mutual resonance may terminate in response to the stored energy all being expended.

Energy initially stored in the source resonator may be classified into 1) a portion expended due to an internal resistance and a radiation resistance and 2) a portion delivered to the target resonator through a mutual resonance. A strong mutual coupling may involve the energy rebound phenomenon occurring between the two resonators since a speed of delivering energy from a resonator to an opponent resonator is significantly greater than a speed of consuming energy due to a resistance component.

The waveform of a signal applied to the source resonator at a TX end may be different for a situation in which the source resonator and the target resonator strongly, mutually resonate and a situation in which the source resonator and the target resonator fail to mutually resonate. When a resonant frequency of the target resonator matches a resonant frequency of the source resonator, a mutual resonance may occur between the two resonators, and the energy rebound phenomenon may occur. When the target resonator fails to mutually resonate, energy stored in the source resonator may be gradually expended due to a resistance component. An RX end may modulate data depending on whether to generate a mutual resonance, and the TX end may compare a signal waveform when the mutual resonance occurs with a signal waveform when the mutual resonance does not occur, and may demodulate data transmitted from the RX end according to a result of comparison.

A waveform of a signal applied to the target resonator at the RX end may significantly differ for a situation in which the source resonator and the target resonator strongly mutually resonate and a situation in which the source resonator and the target resonator fail to mutually resonate. Whether the mutual resonance occurs and whether the energy rebound phenomenon occurs may be determined based on whether energy is supplied to the source resonator. For instance, the RX end may demodulate data transmitted from the TX end by analyzing the waveform of the signal.

Figure 8:
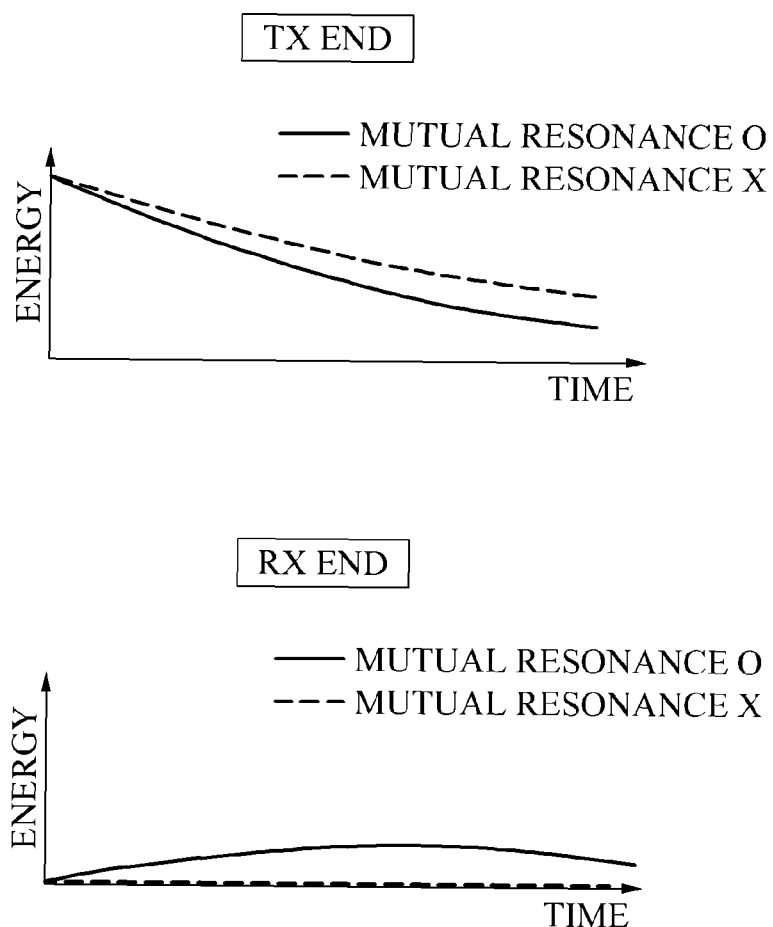
FIG. 8 is a graph illustrating a variation of energy applied to a source resonator and a target resonator weakly, mutually coupled in a communication system using wireless power.

FIG. 8 illustrates a variation of energy applied to a source resonator and a target resonator weakly mutually coupled in a communication system using wireless power.

When the source resonator and the target resonator weakly mutually coupled, energy initially stored in the source resonator may be expended more rapidly due to a resistance component when compared to being delivered to the target resonator. Thus, an energy rebound phenomenon may not occur.

The waveform of the signal applied to the source resonator at a TX end may be different for a situation in which the source resonator and the target resonator weakly mutually resonate and a situation in which the source resonator and the target resonator do not mutually resonate, and the difference would be less when compared to a case of a strong mutual coupling. The waveform of the signal applied to the target resonator at an RX end may differ for a situation in which the source resonator and the target resonator weakly mutually resonate and a situation in which the source resonator and the target resonator fail to mutually resonate.

Since the energy rebound phenomenon may not occur in the weak mutual coupling, a difference in waveforms according to whether a mutual resonance occurs may not be clear when compared to a case of the strong mutual coupling.

Figure 9:
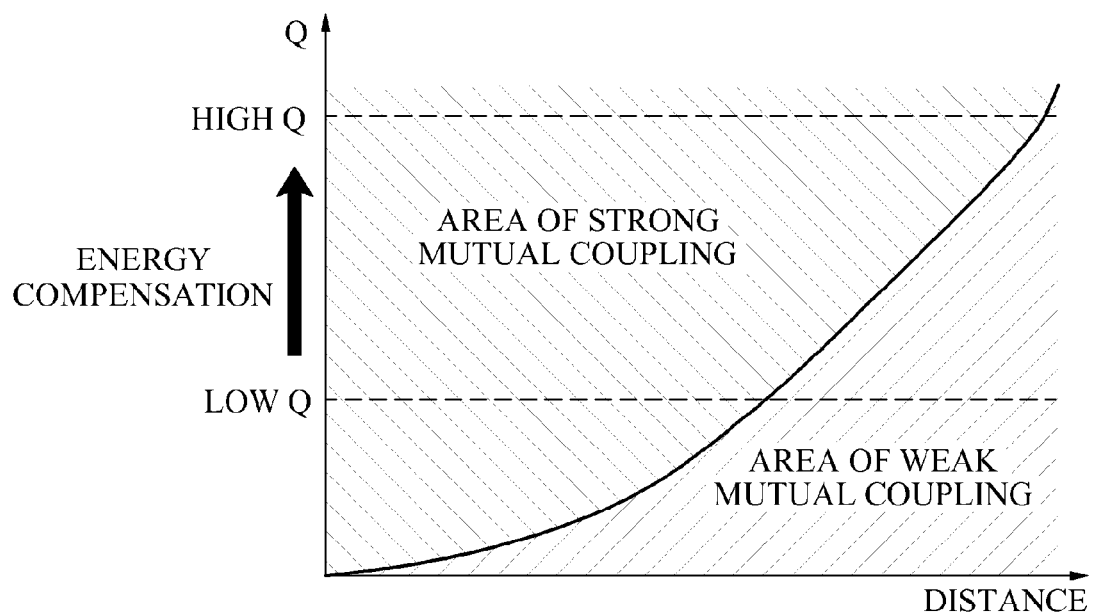
FIG. 9 is a graph illustrating an operational characteristic of a mutual coupling according to a Q factor and a distance between a source resonator and a target resonator.

FIG. 9 illustrates an operational characteristic of a mutual coupling according to a Q factor and the distance between a source resonator and a target resonator.

Referring to FIG. 9, a Low Q corresponds to a Q factor when a negative resistance is disconnected from a resonator, and a High Q corresponds to a case of increasing the Q factor by connecting the negative resistance to the resonator. Connecting the negative resistance to the resonator may be equivalent to compensating for energy expended in the resonator. That is, a resonator of the Low Q may turn to a resonator of the High Q when energy stored in the resonator of the Low Q is compensated for using an active element.

Referring to a graph, as the Q factor increases, the distance at which a strong mutual coupling occurs may increase. That is, the distance between the source resonator and the target resonator at which a strong mutual coupling occurs may increase. Increasing of the Q factor may indicate an enhancement in a performance of transmitting and receiving information between the source resonator and the target resonator.

Figure 10:
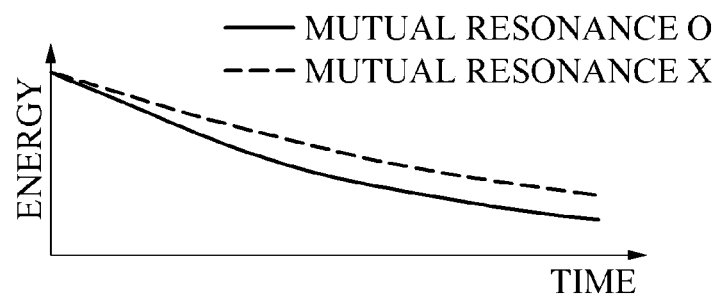
FIG. 10 is a graph illustrating a variation of energy applied to a source resonator when a Q factor of the source resonator increases through energy compensation in a communication system using wireless power.
Figure 10:
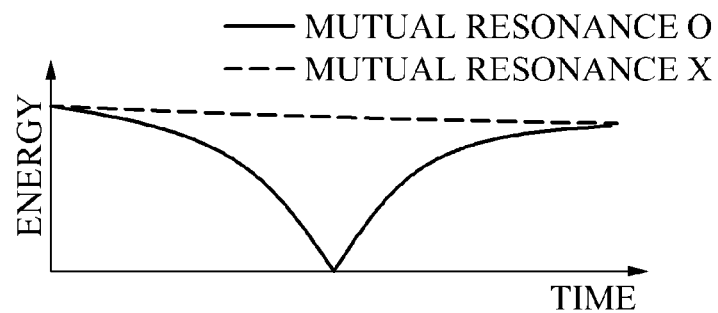

FIG. 10 illustrates a variation of energy applied to a source resonator when a Q factor of the source resonator increases through energy compensation in a communication system using wireless power.

The graphs of FIG. 10 illustrate a waveform of a signal applied to a source resonator of a Low Q factor before compensating for expended energy, and a waveform of a signal applied to a source resonator of a High Q factor after compensating for expended energy. The Low Q factor may involve a weak mutual resonance phenomenon, and a relatively slight variation of a waveform according to whether a mutual resonance occurs. The High Q factor may involve a relatively significant variation of a waveform according to whether a mutual resonance occurs due to a strong mutual resonance phenomenon. Thus, a TX end may detect whether a mutual resonance occurs through a variation of a waveform, and may demodulate information transmitted from an RX end.

Figure 11:
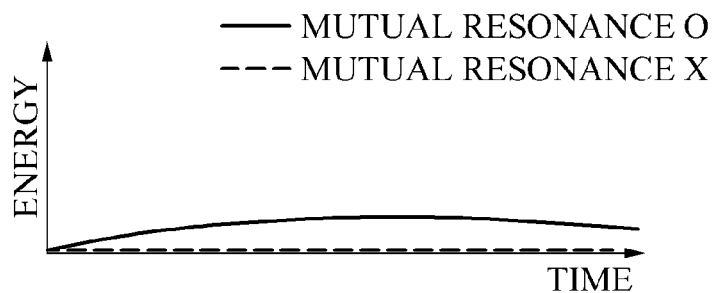
FIG. 11 is a graph illustrating a variation of energy applied to a target resonator when a Q factor of the target resonator increases through energy compensation in a communication system using wireless power.
Figure 11:
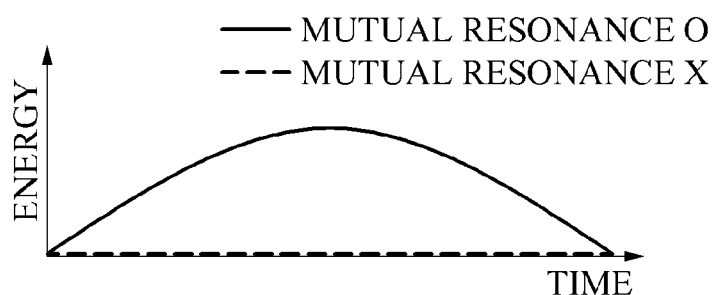

FIG. 11 illustrates a variation of energy applied to a target resonator when a Q factor of the target resonator increases through energy compensation in a communication system using wireless power.

Graphs of FIG. 11 illustrate a waveform of a signal applied to a target resonator of a Low Q factor before compensating for energy expended, and a waveform of a signal applied to a target resonator of a High Q factor after compensating for energy expended. The Low Q may involve a weak mutual resonance phenomenon, and a relatively slight variation of a waveform according to whether a mutual resonance occurs. The High Q factor may involve a relatively significant variation of a waveform according to whether a mutual resonance occurs due to a strong mutual resonance phenomenon. Thus, an RX end may detect whether a mutual resonance occurs through a variation of the waveform, and may demodulate information transmitted from a TX end.

Figure 12:
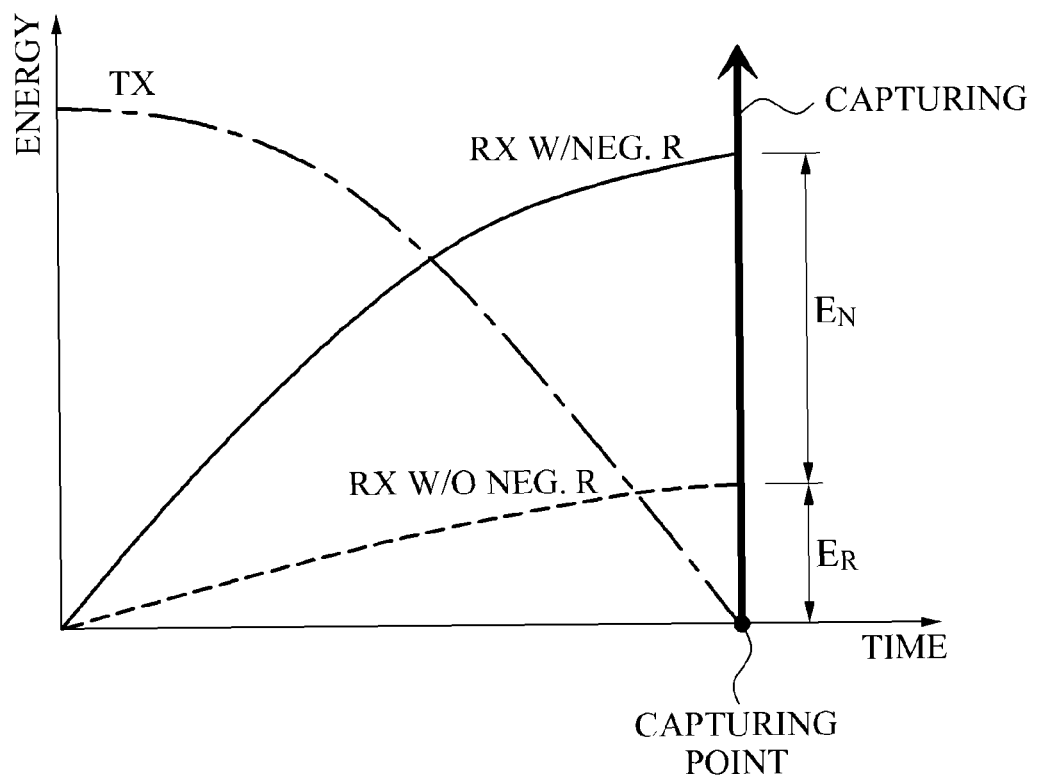
FIG. 12 is a graph illustrating stored energy when a negative resistance is used and not used in a target resonator.

FIG. 12 illustrates stored energy when a negative resistance is used and not used in a target resonator.

Using a negative resistance may indicate compensating for energy expended due to a resistance component in a target resonator. When the negative resistance is connected to a source resonator and a target resonator to enhance a data transmission performance, additional energy for operating as the negative resistance may be used. A TX end may correspond to a device, for example, a mobile phone, and/or the like having a predetermined degree of freedom for using additional energy, and an RX end may correspond to a device, for example, a tiny sensor having a restriction on using additional energy. Thus, the TX end may be provided with energy from a power supply device, and the RX end may use a source of supply for additional energy for using the negative resistance. Further, energy used in the source of supply may be compensated for.

Referring to FIG. 12, in response to maximum energy being stored in the target resonator, the RX end may terminate a mutual resonance phenomenon, and may capture stored energy. When the negative resistance is disconnected from the target resonator, energy $E_R$ may be stored in the target resonator. When the negative resistance is connected to the target resonator, energy $E_N$ may be additionally stored in the target resonator. It may be predicted the additionally stored energy $E_N$ corresponds to energy for using the negative resistance in the target resonator. The energy $E_N$ may correspond to energy also stored in the target resonator by compensating for energy expended in the target resonator through the negative resistance. The RX end may compensate for energy used for operating the negative resistance using the energy $E_N$ additionally stored in the target resonator in the captured energy. In this instance, the energy used for operating the negative resistance may be provided from a handiness battery. The RX end may compensate for energy used for operating the negative resistance using energy captured in the handiness battery from the target resonator.

The units and other elements described herein may be implemented using hardware components, software components, or a combination thereof, in some embodiments. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication device using wireless power, the communication device comprising:
   a transmitter configured to transmit, to a target resonator, energy stored in a source resonator through mutual resonance;
   an energy compensator configured to compensate for energy expended in the source resonator;
   a controller configured to control an electrical connection of a power input unit selectively providing energy to the source resonator,
   wherein the power input unit is configured to be electrically separated from the transmitter while the transmitter transmits the energy stored in the source resonator, and
   wherein the transmitter comprises a storage capacitor configured to store energy from an input voltage provided by the power input unit when the source resonator is in self resonance and configured to release energy to the target resonator when the source resonator and the target resonator are in mutual resonance and the electrical connection is broken.

2. The communication device of claim 1, further comprising:
   a modulator configured to modulate information using mutual resonance between the source resonator and the target resonator.

3. The communication device of claim 2, wherein the modulator modulates the information depending on whether generating mutual resonance between the source resonator and the target resonator is performed.

4. The communication device of claim 2, wherein the modulator modulates the information by quantizing a level of the energy stored in the source resonator.

5. The communication device of claim 1, wherein the energy compensator compensates for energy expended due to an internal resistance, a radiation resistance, or both, of the source resonator in the energy stored in the source resonator.

6. The communication device of claim 1, wherein the energy compensator comprises:
   a detector configured to detect energy expended in the source resonator; and
   a compensator configured to compensate for the detected energy.

7. The communication device of claim 1, wherein the energy compensator compensates for the expended energy using an active element so that a quality (Q) factor of the source resonator has a value greater than or equal to a predetermined value.

8. The communication device of claim 1, wherein the controller determines whether to generate mutual resonance between the source resonator and the target resonator by controlling the electrical connection between the source resonator and a power source connected to the power input unit, so the mutual resonance is generated based on the electrical connection being broken.

9. The communication device of claim 8, wherein the controller controls an electrical connection between the power source and the energy compensator so that energy is provided to the energy compensator while the source resonator is in mutual resonance with the target resonator.

10. The communication device of claim 1, further comprising:
    a receiver configured to receive energy transmitted from the target resonator through mutual resonance between the source resonator and the target resonator; and
    a demodulator configured to determine whether mutual resonance occurs by detecting a waveform of the received energy, and to demodulate information transmitted by the target resonator based on whether mutual resonance occurs.

11. A communication system with wireless power, the communication system comprising:
    a power transmission unit, comprising:
      a first modulator configured to modulate information using mutual resonance between a source resonator and a target resonator;
      a first transmitter configured to store energy in the source resonator while the source resonator is in self resonance and configured to transmit, to the target resonator, the energy stored in the source resonator through mutual resonance;
      a first energy compensator configured to compensate for energy expended in the source resonator;
      a first controller configured to control an electrical providing energy to the source resonator;
      a first receiver configured to receive energy transmitted from the target resonator through mutual resonance between the source resonator and the target resonator;
      a first demodulator configured to determine whether mutual resonance occurs by detecting a waveform of the received energy, and to demodulate information transmitted by the source resonator based on whether mutual resonance occurs;
    a power receiving unit comprising:
      a second energy compensator configured to compensate for energy expended in the target resonator; and
      a second controller configured to control an electrical connection between the target resonator and a load provided with energy from the target resonator.

12. The communication system of claim 11, the power receiving unit further comprising:

a second modulator configured to modulate information using mutual resonance between the source resonator and the target resonator; and a second transmitter configured to transmit, to the source resonator, energy stored in the target resonator through mutual resonance.

13. The communication system of claim 12, the power receiving unit further comprising:

a second receiver configured to receive energy transmitted from the target resonator through mutual resonance between the source resonator and the target resonator; and a second demodulator configured to determine whether mutual resonance occurs by detecting a waveform of the received energy, and to demodulate information transmitted by the target resonator based on whether mutual resonance occurs.

14. The communication system of claim 11, wherein the first energy compensator compensates for the energy expended using an active element so that a quality (Q) factor of the source resonator has a value greater than or equal to a predetermined value.

15. The communication system of claim 11, wherein the second energy compensator compensates for the expended energy using an active element so that a Q factor of the target resonator has a value greater than or equal to a predetermined value.

16. The communication system of claim 11, wherein the first controller controls the electrical providing of energy to the source resonator so that energy is not provided to the source resonator when the first transmitter is controlled to transmit the energy stored in the source resonator through mutual resonance.

17. A communication method using wireless power, the communication method comprising:

compensating for energy expended in a source resonator;

controlling an electrical connection providing energy to the source resonator to store the energy in the source resonator while the source resonator is in self resonance; and transmitting, to a target resonator, the energy stored in the source resonator through mutual resonance, wherein the source resonator comprises a storage capacitor configured to store energy from an input voltage provided by the power input unit when the source resonator is in self resonance and configured to release energy to the target resonator when the source resonator and the target resonator are in mutual resonance and the electrical connection is broken.

18. The communication method of claim 17, wherein the compensating comprises compensating for energy expended due to an internal resistance, a radiation resistance, or both, of the source resonator in the energy stored in the source resonator.

19. The communication method of claim 17, further comprising:

modulating information using mutual resonance between the source resonator and the target resonator.

20. The communication method of claim 17, wherein the controlling of the electrical connection includes controlling the electrical connection to be broken during the transmitting of the energy stored in the source resonator.

21. A communication device using wireless power, the communication device, comprising:

a controller to control a source resonator of a transmitter to at least alternately be in mutual resonance with a target resonator of a receiver and in self resonance;

a power input unit configured to selectively store energy into the source resonator when the source resonator is controlled to be in self resonance; and the transmitter configured to transmit energy stored in the source resonator to the target resonator when the source resonator is controlled to be in the mutual resonance with the target resonator, and wherein the transmitter comprises a storage capacitor configured to store energy from an input voltage provided by the power input unit when the source resonator is in self resonance and configured to release energy to the target resonator when the source resonator and the target resonator are in mutual resonance and the electrical connection is broken.

22. The communication device of claim 21, wherein the controller is further configured to control the power input unit to electrically connect a power source to the transmitter to store the energy into the source resonator while the controller controls the source resonator to be in self resonance, and configured to control the power input unit to electrically isolate the transmitter from the power source while the source resonator and the target resonator are in mutual resonance.

23. The communication device of claim 22, wherein the communication device further comprises an energy compensator configured to selectively decrease of an effective resistance of the source resonator to increase a Q factor of the source resonator to compensate for energy loss by the source resonator cause by an internal resistance and/or radiance resistance of the source resonator, while the source resonator is in the mutual resonance with the target resonator, and wherein the energy compensator is connected to the energy source to provide initial power to the energy compensator when the source resonator and the target resonator are in mutual resonance.

* * * * *